United States Patent
Marzorati et al.

(10) Patent No.: US 11,036,488 B2
(45) Date of Patent: Jun. 15, 2021

(54) SYSTEM AND METHOD FOR OPTIMAL HIERARCHICAL UPGRADE TIME PREDICTION

(71) Applicant: International Business Machines Corporation, Armonk, NY (US)

(72) Inventors: Mauro Marzorati, Lutz, FL (US); Shikhar Kwatra, Durham, NC (US); Gary Francis Diamanti, Wake Forest, NC (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/538,128

(22) Filed: Aug. 12, 2019

(65) Prior Publication Data
US 2021/0048996 A1    Feb. 18, 2021

(51) Int. Cl.
*G06F 8/65*  (2018.01)
*G06N 20/00* (2019.01)

(52) U.S. Cl.
CPC .............. *G06F 8/65* (2013.01); *G06N 20/00* (2019.01)

(58) Field of Classification Search
CPC .................................. G06F 8/65; G06N 20/00
See application file for complete search history.

(56) References Cited

U.S. PATENT DOCUMENTS 9,158,525 B1 * 10/2015 Naganathan ............ G06F 9/542
9,763,093 B2    9/2017 Richards et al.
9,781,148 B2   10/2017 Mahaffey et al.
9,832,646 B2   11/2017 Richards et al.
10,185,550 B2 *  1/2019 Smith .................... G06F 8/65
10,327,159 B2 *  6/2019 Tan ...................... H04W 24/02
10,411,959 B1 *  9/2019 Faibish ............... H04L 67/1097
10,540,704 B2 *  1/2020 Mazed .............. H01L 27/14645
10,769,227 B2 *  9/2020 Tu .......................... H04L 67/306
2003/0088534 A1 *  5/2003 Kalantar .............. G06Q 10/06
                                                                 706/50

(Continued)

FOREIGN PATENT DOCUMENTS

WO    WO 0064178 A1    10/2000

OTHER PUBLICATIONS

Marjani et al., "Big IoT Data Analytics: Architecture, Opportunities, and Open Research Challenges", 2017, IEEE (Year: 2017).*

(Continued)

*Primary Examiner* — Wei Y Zhen
*Assistant Examiner* — Junchun Wu
(74) *Attorney, Agent, or Firm* — Terrile, Cannatti & Chambers, LLP; Emmanuel A. Rivera (57) ABSTRACT

A method, system and computer-usable medium are disclosed for updating, upgrading, or performing maintenance on connected devices that includes analyzing usage of the connected devices. A hierarchical representation is formed of the connected devices based on dependency of the devices. Artificial Intelligence/Machine Learning is implemented as to the usage and hierarchical representation to create a model to update or upgrade the connected devices. A schedule is created based on the model that minimizes risk and maximize availability of the connected devices.

17 Claims, 6 Drawing Sheets

(56) References Cited

U.S. PATENT DOCUMENTS

| | | | |
|---|---|---|---|
| 2004/0133889 A1* | 7/2004 | Colle | G06Q 10/06 718/100 |
| 2006/0206587 A1 | 9/2006 | Fabbrocino | |
| 2008/0104220 A1* | 5/2008 | Vanyukhin | H04L 41/0893 709/223 |
| 2009/0119657 A1 | 5/2009 | Link, II | |
| 2009/0265699 A1 | 10/2009 | Toeroe | |
| 2010/0114618 A1* | 5/2010 | Wilcock | G06Q 10/06375 705/7.37 |
| 2012/0102543 A1* | 4/2012 | Kohli | H04L 63/20 726/1 |
| 2014/0244768 A1* | 8/2014 | Shuman | H04W 4/70 709/206 |
| 2014/0244834 A1* | 8/2014 | Guedalia | H04W 4/70 709/224 |
| 2014/0324973 A1* | 10/2014 | Goel | H04L 47/70 709/204 |
| 2016/0196131 A1* | 7/2016 | Searle | H04L 29/06 717/173 |
| 2018/0330238 A1* | 11/2018 | Luciw | G06N 3/0454 |
| 2019/0205552 A1* | 7/2019 | Espinosa | G06F 16/9538 |
| 2019/0260785 A1* | 8/2019 | Jenkinson | G06F 21/554 |
| 2019/0391800 A1* | 12/2019 | Lin | H04L 67/34 |
| 2020/0021607 A1* | 1/2020 | Muddu | G06F 40/134 |
| 2020/0103894 A1* | 4/2020 | Cella | H04B 17/309 |

OTHER PUBLICATIONS

Lavassani et al., "Combining Fog Computing with Sensor Mote Machine Learning for Industrial IoT", May 2018, MDPI (Year: 2018).*

Azimi et al., "HiCH: Hierarchical Fog-Assisted Computing Architecture for Healthcare IoT", Sep. 2017, ACM, vol. 16, No. 5s, Article 174 (Year: 2017).*

Chen et al., "Internet of Things Based Smart Grids Supported by Intelligent Edge Computing", Jun. 2019, IEEE (Year: 2019).*

Cisco; The Internet of Things: Reduce Security Risks With Automated Policies, 2015, pp. 1-6.

IPCOM000206376D; Predicting Optimal Time for Software Upgrade Based on User's Calendar and Instant Messaging Activity, Apr. 20, 2011.

IPCOM000258224D; Method and System for Predictive Configuration and Polling of Non-IOT Devices for Augmented Safety, Apr. 19, 2019.

McKinsey et al; Smartening Up With Artificial Intelligence (AI): What's in it for Germany and its Industrial Sector? Apr. 2017.

Souppaya, M. et al.; Guidelines for Managing the Security of Mobile Devices in the Enterprise, NIST Special Publication 800-124, Revision 1, Jun. 2013.

Smartthings; There's potential in your everyday things, 2019.

Ionut Ilascu; Urgent/11 VxWorks RTOS Vulnerabilities Found, Critical Systems Affected, Jul. 29, 2019.

* cited by examiner

SYSTEM AND METHOD FOR OPTIMAL HIERARCHICAL UPGRADE TIME PREDICTION

BACKGROUND OF THE INVENTION

Field of the Invention

The present application relates generally to an improved data processing system and method, and more specifically to improved prediction and scheduling of upgrading of devices.

Description of the Related Art

Connected devices, such as Internet of things or IOT devices, can be routinely upgraded and/or updated. Upgrading and/or updating of devices may require considerable down time, during which the devices are offline, inoperable, or unavailable for use. This can be problematic in implementations when devices are relied on by other devices and/or are critical for operation of an enterprise, such as a business, household, etc.

For example, a building, such as a home, may use a smart thermostat to control heating ventilation air conditioning (HVAC) throughout the building. For example, on an occasion, a software update is needed for the smart thermostat; however, the update may be during an especially hot summer. Upgrading or updating the smart thermostat during the middle of a hot summer day would shut down the air conditioning. A better time for the upgrade may be during the early morning hours. In another example, there may be multiple video cameras monitoring a home. There may be some redundant video coverage, allowing a video camera to go offline to be updated, while a video camera with a redundant view remains operational. It is desirable to keep one redundant camera on, while another or other cameras are upgraded and/or updated. In another example, a smart outlet supports multiple devices. Upgrading and/or updating the smart outlet would mean not only downtime for the smart outlet, but the devices that depend (i.e., are plugged into) the smart outlet.

There are other examples of how upgrading and/or updating devices can affect other devices, including business enterprise implementations. Enterprise servers/computers depend on other servers/computers; communication devices depend on central controlling devices; various devices depend on database stores, etc. In such instances, coordination is needed to assure optimum service that is either uninterrupted or results in minimal negative impact.

SUMMARY OF THE INVENTION

A method, system and computer-usable medium are disclosed for updating, upgrading, or performing maintenance on connected devices that includes analyzing usage of the connected devices. A hierarchical representation is formed of the connected devices based on dependency of the devices. Artificial Intelligence/Machine Learning is implemented as to the usage and hierarchical representation to create a model to update or upgrade the connected devices. A schedule is created based on the model that minimizes risk and maximize availability of the connected devices.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

In certain embodiments, the described system, method, and computer product implements a system hierarchy where devices/users can request permission to be upgraded and/or updated. Throughout the description, the terms "upgrade" and "update" are considered to be interchangeable, where an upgraded or updated device is either modified with new software and/or hardware or is replaced with a different device. The resulting upgrade or update results in the device being offline and unavailable for use, leading to considerable down time. In certain implementations, the request to be upgraded is made to and approved by a central authority, such as a manager/supervisor. In certain implementations, there can be a local manager(s) and an enterprise (i.e., overall) manager. In certain implementations, consideration is made as to proximity of redundant devices that can take over for offline device, dependency of devices upon other devices, specific conditions that prevent a device from going offline.

Described herein is an implicit/explicit learning system and method, that provides for a feedback learning mechanism to re/configure input features and re/adjust timing of one or plurality of devices to go in offline mode based on efficiency handling of tasks covered by alternate devices, under a centralized management authority, such as a system manager. An optimal time for updates and/or upgrades, and communication of devices to negotiate the time to go offline is re/configured based on dynamically learning from previous pattern history(ies) or can be explicitly modified or triggered by the centralized management authority (e.g., the system manager).

In certain embodiments, analysis is performed on as to an enterprise of devices' pattern, which includes a hierarchical structure representation of the devices, and determination is performed as to the appropriate timing for a set/subset of devices to go offline for an update and/or upgrade, as requested by the devices. The centralized management authority (e.g., the system manager) can provide the schedule to go offline based on backup or redundancy of other devices to support offline devices. The management of the devices can be in the aggregate, taking into consideration total overall impact and risk of device downtime, and can be based on current and forecasted tolerance levels in order to maximize the effective uptime of the devices.

Figure 1:
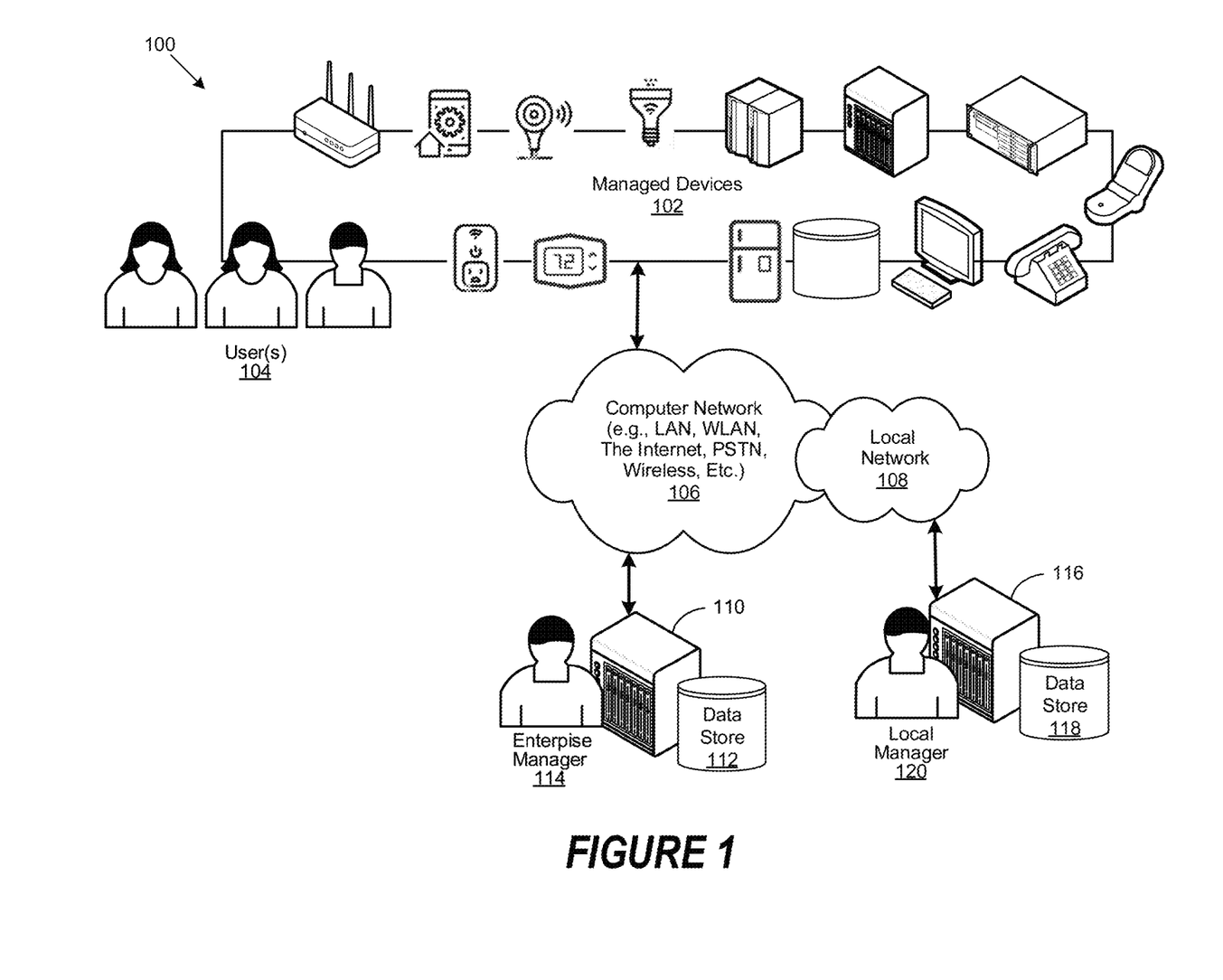
FIG. 1 depicts a system for optimal hierarchical upgrade time prediction.

FIG. 1 is an example system that provides optimal hierarchical upgrade time prediction. System 100 includes various plurality of managed devices 102. The managed devices 102 periodically are upgraded and/or updated. In certain implementations, the managed devices 102 are connected, and certain devices may be dependent on other devices being operational. The managed devices 102 can be part of a local system and/or enterprise system. In certain implementations, the managed devices 102 are considered as an Internet of Things or IOT.

Examples of managed devices 102 can include wireless routers, lighting/lightbulbs, HVAC control, intercom, speakers, video surveillance/video cameras, electrical control, smart outlets/sockets, video doorbell/monitor, door locks, sensors, smart appliances, smart thermostats, servers, telephone/communication, workstations, laptops, mobile phones, databases/storage, mobile and wired telephones, etc.

In certain implementations, the managed devices can be classified or structured based on usage, in a hierarchical representation that classifies the managed devices 102 by device type, services provided, dependencies, etc. Furthermore, by implementing artificial intelligence or machine learning, in certain implementations, an upgrade model (e.g., schedule) can be provided based on hierarchical representation and analyzed usage that considers factors such as device redundancy (backup), device availability, device usage, device priority, etc. In certain implementations, a predicted usage of the usage of the managed devices 102 can be based on a history or usage.

The managed devices 102 can be specific to or shared by user(s) 104. In certain implementations, user(s) 104 can request for updates of specific managed devices 102. The update requests can override scheduled updates of managed devices 102. In certain implementations, requests from user(s) 104 are one-time requests. For example, a user 104 may have a particular event that requires the use of a managed device 102, and it is imperative that to be able to use such managed device 102.

In certain embodiments, the system 100 includes a network 106 which can include Local Area Networks (LANs), Wireless Local Area Networks (WLANs), the Internet, the Public Switched Telephone Network (PSTN), other wireless networks. Network 106 can further include other network topology that can be used to interconnect the elements of system 100. Network 106 can also include "cloud" networks. In various embodiments, network 106 includes various local networks 108.

In certain implementations, an information handling system 110 is connected to the network 106. The information handling system 110 can include or be connected to a data store 112. The information handling system 110 can be managed by an enterprise device manager 114. In certain implementations, an information handling system 116 is connected to the local network 108. The information handling system 116 can include or be connected to a data store 118. The information handling system 116 can be managed by a local device manager 120. In certain implementations, a physical location can have local device manager 120, who can be a geographic specific manager, who may manage a data center, local HVAC, network traffic, local computing systems, etc. The managed devices 102 can be classified based on role, type, dependency, etc. and managed by enterprise device manager 114 and/or local device manager 120. The managed devices 102 or user(s) 104 can make requests to the enterprise device manager 114 and/or local device manager 120 to go offline for updates and/or upgrades (i.e., maintenance). Scheduled downtime can be provided based on the classification and request to assure minimal impact on the system 100. In certain implementations, managed devices 102 classification, hierarchical representation, history or usage, projected usage, etc. can be stored in data store 112 and/or data store 118.

Figure 2:
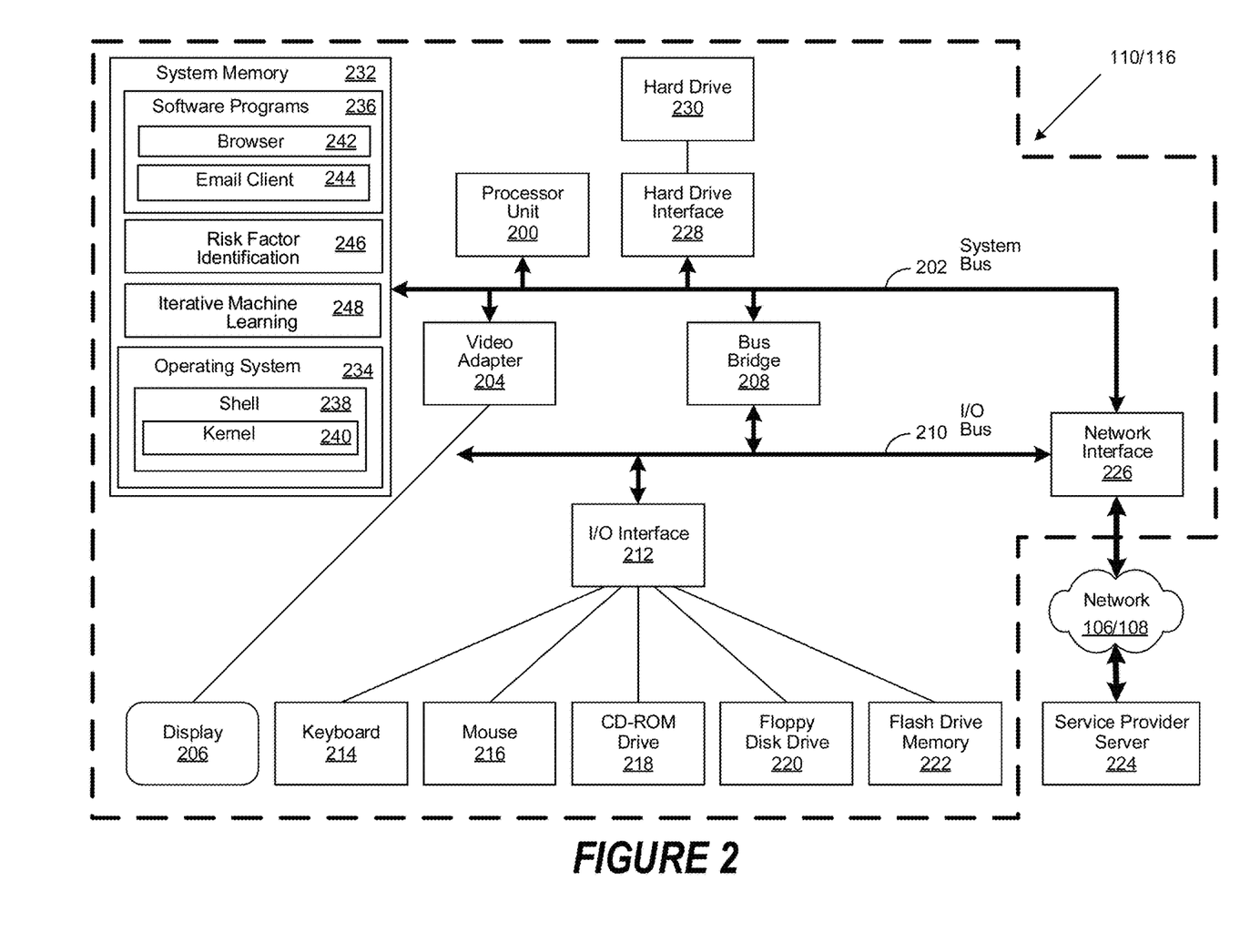
FIG. 2 is a block diagram of an information processing system capable of performing computing operations.

FIG. 2 illustrates an information processing system, and in certain embodiments the information processing system 110 or 116. In particular, information processing system 110 or 116 includes a processor and common components, which is a simplified example of a computer system capable of performing the computing operations described herein.

Information processing system 110 or 116 includes a processor unit 200 that is coupled to a system bus 202. A video adapter 204, which controls a display 206, is also coupled to system bus 202. System bus 202 is coupled via a bus bridge 208 to an input/output (I/O) bus 210. An I/O interface 212 is coupled to I/O bus 210. The I/O interface 212 affords communication with various I/O devices, including a keyboard 214, a mouse 216, a Compact Disk-Read Only Memory (CD-ROM) drive 218, a floppy disk drive 220, and a flash drive memory 222. The format of the ports connected to I/O interface 212 may be any known to those skilled in the art of computer architecture, including but not limited to Universal Serial Bus (USB) ports. The information processing system 110 or 116 is able to communicate with a service provider server 224 via network 106 or 108 using a network interface 226, which is coupled to system bus 202.

A hard drive interface 228 is also coupled to system bus 202. Hard drive interface 228 interfaces with a hard drive 230. In an embodiment, hard drive 230 populates a system memory 232, which is also coupled to system bus 202. Data that populates system memory 232 includes the information processing system's 110 or 116 operating system (OS) 234 and software programs 236.

OS 234 can include a shell 238 for providing transparent user access to resources such as software programs 236. Generally, shell 238 is a program that provides an interpreter and an interface between a user and the operating system, OS 234. More specifically, shell 238 executes commands that are entered into a command line user interface or from a file. Thus, shell 238 (as it is called in UNIX®), also called a command processor in Windows®, is generally the highest level of the operating system software hierarchy and serves as a command interpreter. The shell 238 can provide a system prompt, interprets commands entered by keyboard, mouse, or other user input media, and sends the interpreted command(s) to the appropriate lower levels of the operating system, OS 234 (e.g., a kernel 240) for processing. While shell 238 generally is a text-based, line-oriented user interface, the present invention can also support other user interface modes, such as graphical, voice, gestural, etc.

As depicted, OS 234 also includes kernel 240, which includes lower levels of functionality for OS 234, including essential services required by other parts of OS 234 and software programs 236, including memory management, process and task management, disk management, and mouse and keyboard management. Software programs 236 may include a browser 242 and email client 244. Browser 242 includes program modules and instructions enabling a World Wide Web (WWW) client (i.e., information processing system 110 or 116) to send and receive network messages to the Internet using Hyper Text Transfer Protocol (HTTP) messaging, thus enabling communication with service provider server 224.

The hardware elements depicted in the information processing system 110 or 116 are not intended to be exhaustive, but rather are representative to highlight components used by the present invention. For instance, the information processing system 110 or 116 may include alternate memory storage devices such as magnetic cassettes, Digital Versatile Disks (DVDs), Bernoulli cartridges, and the like. These and other variations are intended to be within the spirit, scope and intent of the present invention.

In certain implementations, the information processing system 110 or 116 includes a risk factor identification module 246 and an iterative machine language module 248. The risk factor identification module 246 and iterative machine language module 248 can be configured to analyze usage of the plurality of connected managed devices 102, to form a hierarchical representation that includes classification of device types, services provided, device dependencies, etc. Artificial intelligence/machine learning is implemented based on the hierarchical representation, to form an update and/or upgrade model that considers factors that include backup/redundancy, device availability, device usage, device priority, etc. The update and/or upgrade model can be used to schedule a period to perform an update and/or upgrade that minimizes risks and increase availability based a predicted usage need of the plurality of connected managed devices 102.

In certain implementations, the risk factor identification module 246 is configured to identify risk factors that are associated with number of backup device(s) available, time of day, previous system upgrade schedule, as well as the "size" or affect (major/minor) of an update and/or upgrade. The iterative machine language module 248 can be configured to predict an update and/or upgrade time, where a subset of the managed devices 102 can go offline. In certain implementations, the prediction can be based on a regression model or alternate classifier extrapolation mechanisms based on unsupervised learning model, where the following can be taking into account: backup systems/devices that available, users' feedback as to manual upgrade of systems/devices, device tracking activity and efficiency with backup systems, downtime for update and/or upgrade, task or operational redundancy of devices, priority between local task(s) of devices involved, forecasted use of device (predictive), etc.

Implicit/Explicit learning Feedback: Feedback learning mechanism in order to reconfigure the input features and re-adjust the timing of one or plurality of devices to go in offline mode based on efficiency handling of tasks covered by alternate devices under the body of system manager. Optimal time for upgrade and the communication of devices to negotiate the time to go offline is re-configured based on dynamically learning from previous pattern history or can be explicitly modified or triggered by the system manager.

Figure 3:
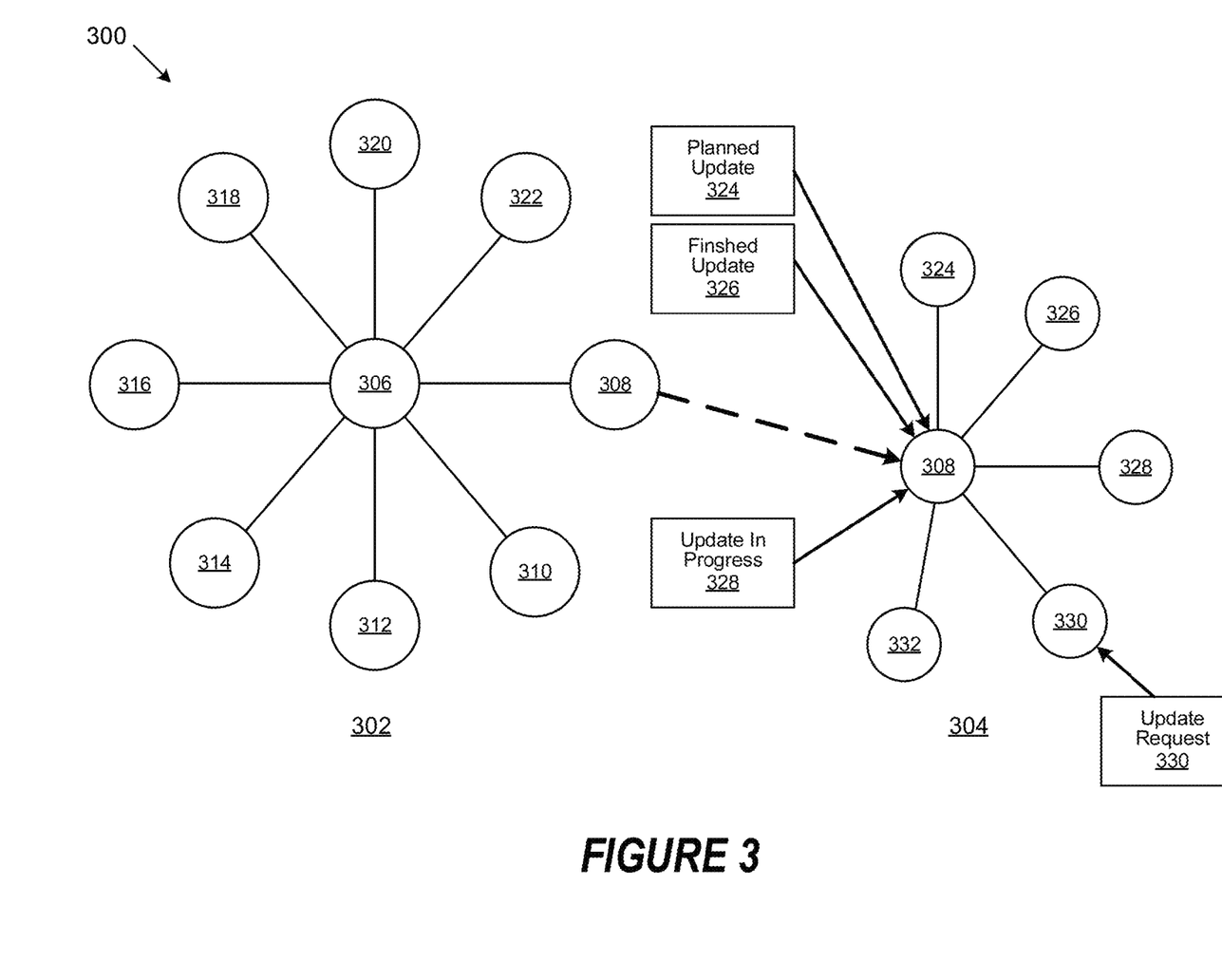
FIG. 3 is a block diagram of a device dependency at an enterprise and a node level.

FIG. 3 illustrates a diagram of a system of device dependency at an enterprise and a node level. The system 300 depicts an enterprise level 302 of devices, and sub-level that depicts a node level 304 of devices. The system 300 is one example of a hierarchical dependency of devices. It is to be understood that other hierarchical structures and examples can be implemented.

At the enterprise level 302, a hub 306 supports various devices 308 to 322. The hub 306 can be also be device from which the other devices 308 to 322 depend upon. In certain implementations, a centralized management authority, such as the enterprise manager 114 described in FIG. 1 can manage the enterprise level 302. In certain implementations, the devices 308 to 322 can be Internet of Things or IOT.

At the node level 304, the device 308 is a centralized device that other devices 324 to 332 depend upon. In certain implementations, the node level 304 can be managed by a local manager 120 as described in FIG. 1. Devices 324 to 332 can also be Internet of Things or IOT. The device 308 can have a planned update (upgrade) 324 and a finished update (upgrade) 326, which can be requested by device 308 or user of the device 308. In certain implementations, a update (upgrade) may be in progress as represented by update in progress 328. In certain implementations, a device which depends on device 308, such as device 330 may request for an update 330. Such an update or upgrade may be required and can include software (e.g., operating system) and/or hardware.

Figure 4:
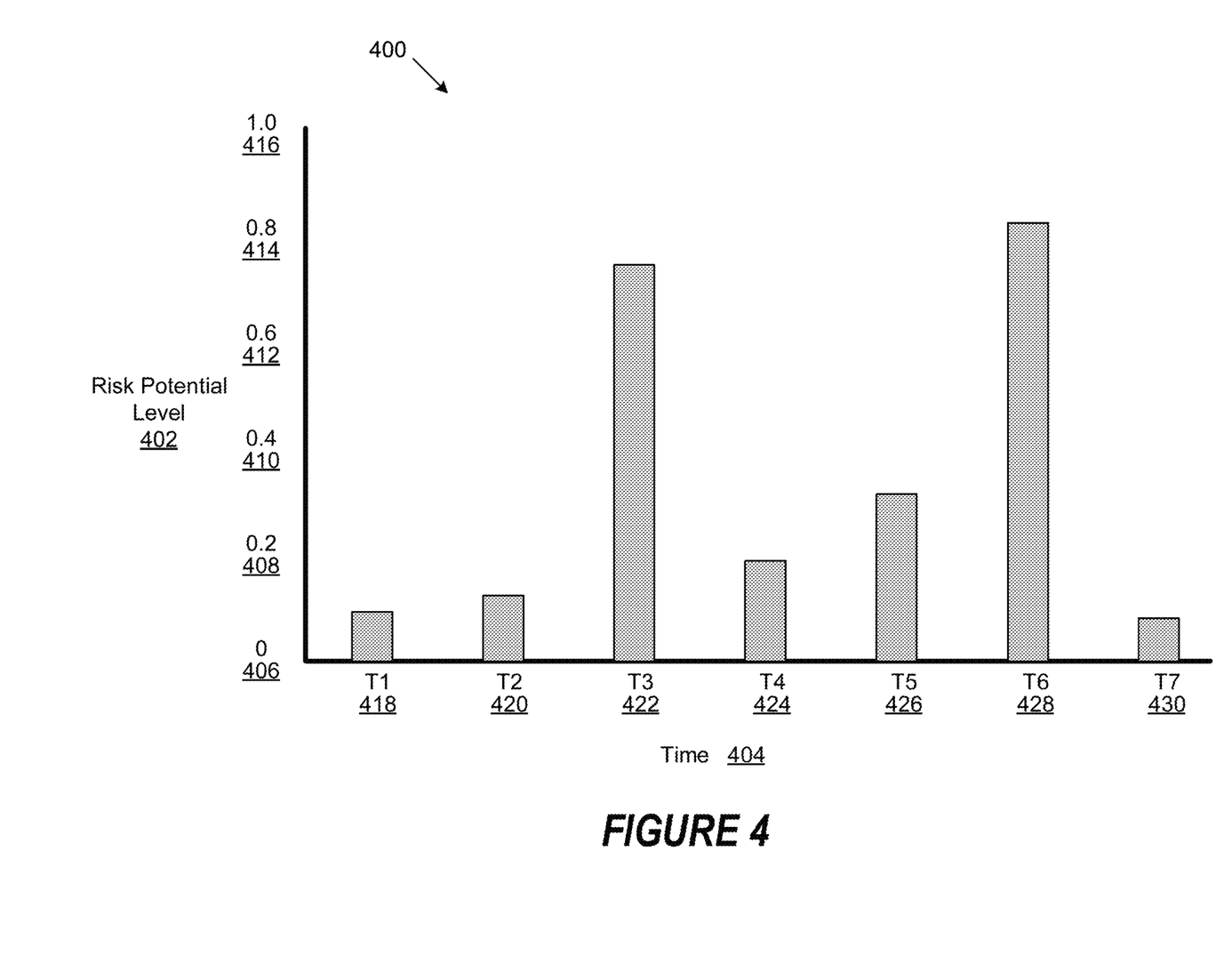
FIG. 4 is a graph of an offline potential risk level for a device.

FIG. 4 illustrates a graph of an offline potential risk level for a device. The graph 400 plots risk potential level 402 against time 404. The graph 400 depicts potential risk level for a particular or specific device. Risk potential level 402 is scaled from a value of "0" represented by 406 to a high value of "1" represented by 416. Incremental values of "0.2" are represented by levels 408 to 414. Specific times are taken or forecasted as presented by T1 418 to T7 430. It is to be understood, that the incremental values of time can be measured in various units, such as seconds, minutes, hours, days, etc. The risk levels at the various times T1 418 to T7 430 can be past usage of the devices or forecasted levels of the device. The higher the level that greater the risk to have the device go offline. Therefore, it would be optimal to take the device offline at low or relatively low levels when performing updates, upgrades, or maintenance. Risk level can describe or represent effects upon other devices, if the device is taking offline.

Figure 5:
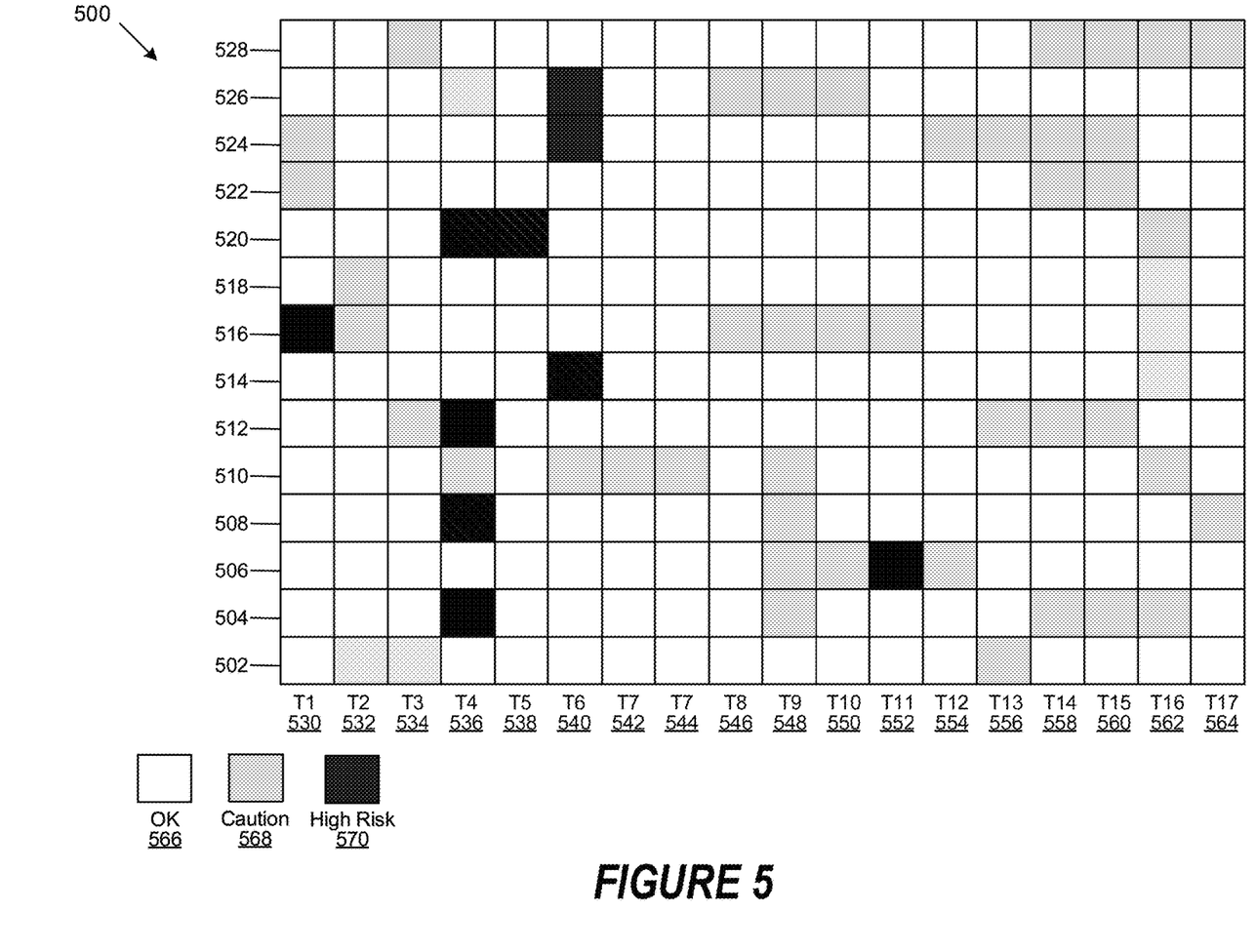
FIG. 5 is a graph of an offline forecast for a group of devices.

FIG. 5 illustrates a graph of an offline forecast for a group of devices. The graph 500 plots a plurality of devices as represented by rows 502 to 528 over a period of time T1 530 to T17 564 as to risk level. A row of the rows 502 to 528 shows by a graphical representation a risk level of a device. As discussed, risk level represents a risk of having a device go offline, such as when the device is updated, upgraded, or has maintenance performed.

It is to be understood, that the incremental values of time as depicted by T1 530 to T17 564 can be measured in various units, such as seconds, minutes, hours, days, etc. The risk levels at the various times T1 530 to T17 564 can be past usage of the devices or forecasted levels of the device.

In this example, risk level is depicted by shading in a box. In this example, a clear box as represented by 566 indicates that is acceptable or okay for a device to go offline. A shaded box as represented by 568 indicates that caution should be taken for the device to go offline. A darken box as represented by 570 indicates that there is a high risk if the device goes offline. It is to be understood, that various levels or scales of risk can be represented by varying shades or colors. For example, the lighter the shading the less risk is involved, and higher risk relates to a darker shading. Essential a "heat map" can be created in two dimensional as to aggregate device risk.

Taken a risk level at a particular time can be taken, as an aggregate for devices as represented by rows 502 to 528. A determination can then be determined, as to an acceptable time for which the devices as an aggregate can go offline. For example, high risk is shown for one or more devices at T1 530, T4 536, T5 538, T6 540, and T11 522. Therefore, taking the devices offline at such times would not be advisable. At the other times, there is no risk or relatively low risk level. Taking the devices at these times would be acceptable.

Figure 6:
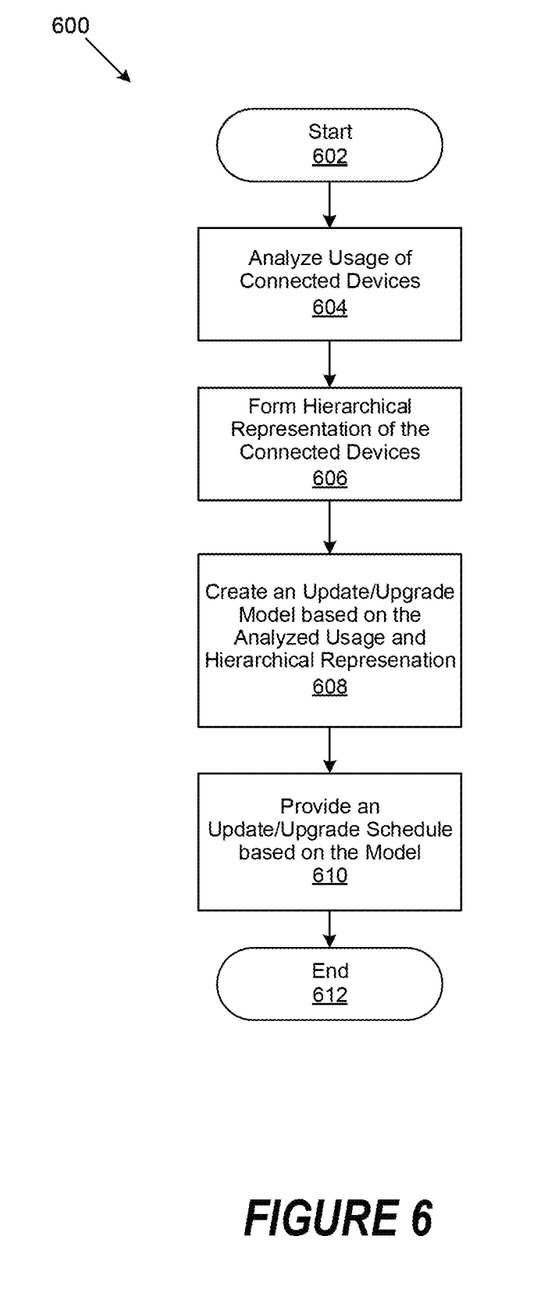
FIG. 6 is a generalized flowchart of the operation for scheduling of upgrading of devices.

FIG. 6 is a generalized flowchart 600 for the operation for scheduling of updating and/or upgrading of devices. At block 602 the process 600 starts. At step 604, an analysis is performed as to usage of connected devices. Usage can be historical and/or projected usage of devices. At step 606, a hierarchical representation of the connected devices is formed. The hierarchical representation can show dependency of the connected devices. The connected devices can be classified as to risk level if taken offline, device types, services provided, etc. At step 608, an update or upgrade model is created based on the usage and hierarchical representation. The model can consider factors such as redundancy of devices (i.e., backup) availability, usage, priority, etc. At the step 610, a schedule is provided as to update, upgrade, or maintenance, in which devices can be taken offline. The schedule minimizes risk and increases availability of the devices based on predicted need. At block 612, the process 600 ends.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method for updating or upgrading connected devices comprising:
    analyzing usage of the connected devices by a feedback learning mechanism to configure or re-configure input features and adjust or re-adjust timing of one or plurality of devices to go in offline mode based on efficiency handling of tasks covered by alternate devices;
    forming a hierarchical representation of the connected devices, based on dependency of the connected devices and the timing for a set/subset of devices to go offline for an update and/or upgrade, as requested by the devices;
    performing machine learning as to the usage and the hierarchical representation to create a model to update or upgrade the connected devices; and
    creating a schedule based on the model that minimizes risk and maximize availability of the connected devices,
    wherein the model considers factors that include device redundancy, device availability, device usage, and device priority.

2. The method of claim 1, wherein the connected devices are Internet of Things (IOT).

3. The method of claim 1, wherein the usage is historical usage.

4. The method of claim 1, wherein the hierarchical representation includes device classification by device type and services provided.

5. The method of claim 1, wherein the creating is performed at an enterprise level.

6. The method of claim 1, wherein the creating is performed by a centralized management authority.

7. A system comprising:
    a processor;
    a data bus coupled to the processor; and
    a computer-usable medium embodying computer program code, the computer-usable medium being coupled to the data bus, the computer program code used for updating or upgrading connected devices and comprising instructions executable by the processor and configured for:
    analyzing usage of the connected devices by a feedback learning mechanism to configure or re-configure input features and adjust or re-adjust timing of one or plurality of devices to go in offline mode based on efficiency handling of tasks covered by alternate devices;
    forming a hierarchical representation of the connected devices, based on dependency of the connected devices and the timing for a set/subset of devices to go offline for an update and/or upgrade, as requested by the devices;
    performing machine learning as to the usage and the hierarchical representation to create a model to update or upgrade the connected devices; and
    creating a schedule based on the model that minimizes risk and maximize availability of the connected devices,
    wherein the model considers factors that include device redundancy, device availability, device usage, and device priority.

8. The system of claim 7, wherein the connected devices are Internet of Things (IOT).

9. The system of claim 7, wherein the usage is historical usage.

10. The system of claim 7, wherein the hierarchical representation includes device classification by device type and services provided.

11. The system of claim 7, wherein the creating is performed at an enterprise level.

12. The system of claim 7, wherein the creating is performed by a centralized authority.

13. A non-transitory, computer-readable storage medium embodying computer program code, the computer program code comprising computer executable instructions configured for:
    analyzing usage of the connected devices by a feedback learning mechanism to configure or re-configure input features and adjust or re-adjust timing of one or plurality of devices to go in offline mode based on efficiency handling of tasks covered by alternate devices;
    forming a hierarchical representation of the connected devices, based on dependency of the connected devices and the timing for a set/subset of devices to go offline for an update and/or upgrade, as requested by the devices;
    performing machine learning as to the usage and the hierarchical representation to create a model to update or upgrade the connected devices; and
    creating a schedule based on the model that minimizes risk and maximize availability of the connected devices,
    wherein the model considers factors that include device redundancy, device availability, device usage, and device priority.

14. The non-transitory, computer-readable storage medium of claim 13, wherein the connected devices are Internet of Things (IOT).

15. The non-transitory, computer-readable storage medium of claim 13, wherein the usage is historical usage.

16. The non-transitory, computer-readable storage medium of claim 13, wherein the hierarchical representation includes device classification by device type and services provided.

17. The non-transitory, computer-readable storage medium of claim 13, wherein the creating is performed by a centralized management authority.

\* \* \* \* \*